Sept. 12, 1967   F. E. ERICKSON   3,340,975
SOLENOID OPERATED CLUTCH MECHANISM
Filed Nov. 9, 1965

INVENTOR.
FREDERICK EDWIN ERICKSON
BY
Meyer, Tilberry & Body
ATTORNEYS

United States Patent Office 3,340,975
Patented Sept. 12, 1967

3,340,975
SOLENOID OPERATED CLUTCH MECHANISM
Frederick Edwin Erickson, Port Byron, Ill., assignor to
E. W. Bliss Company, Canton, Ohio, a corporation of
Delaware
Filed Nov. 9, 1965, Ser. No. 506,940
9 Claims. (Cl. 192—81)

ABSTRACT OF THE DISCLOSURE

A spring clutch is provided having a driven shaft and a driving shaft which have a common axis of rotation. A coiled spring is coaxially wrapped about the two shafts, and the spring exhibits an internal diameter sufficiently small relative to the outer diameters of the shafts that the spring is normally in resilient gripping relationship with both of the shafts. In addition, the spring has opposing free ends which extend radially outward from the shafts. A clutch release mechanism is provided for concurrently engaging and displacing the free ends of the spring in opposing directions about the common axis of rotation so as to unwind and increase the internal diameter of the spring, whereby it is released from its gripping relationship with the shafts.

---

This invention relates to spring clutches for small motors, such as electrical motors of the low r.p.m. type.

More particularly, the invention relates to a novel means for operating spring clutches to obtain quick clutch release with a minimum amount of force and movement.

Spring clutches presently in use normally include a driving drum keyed or splined to a motor drive shaft, an adjacent driven drum coaxial with the driving drum which is mounted on an output shaft. A coil spring having an inner diameter slightly smaller than the diameter of the drums is tightly positioned around the drums to provide clutch engagement under normal operating conditions. This type of clutch is often used in connection with reset timer units operated by synchronous electric motors.

When the ends of the coil spring are turned relative to one another in a direction tending to unwind the spring, the inner diameter of the spring is increased, and with sufficient turning, becomes larger than the diameter of the clutch drums. Thus sufficient turning of the ends of the spring relative to one another causes clutch release, the driving drum being then free to rotate without a load and the driven member being free to rotate or stop, depending on its load.

This type of clutch is normally biased to an engaged condition and the operating force is needed only for disengagement. In order to disengage the clutch, a force must be applied to turn the ends of the spring in opposite directions in a manner tending to unwind the coils. Since the spring is rotating with the drums in its engaged condition, the sudden application of forces to the ends thereof is difficult to achieve and in the past, complicated devices have been necessary to provide proper clutch releases.

The present invention provides a novel means for releasing spring type clutches with a minimum of force and movement, which is particularly suitable for solenoid operation and for use in connection with reset type timers of the type shown in U.S. Patent No. 2,946,902.

According to the present invention, two clutch release members are provided, each one being keyed to an end of a coil spring. When turned in opposite directions in a manner tending to unwind the spring, they are effective to increase the inner diameter of the spring to release the drums. The clutch release members are turned in the desired direction preferably by means of a bifurcated member adapted for linear movement in a direction perpendicular to the axis of the clutch drums to force the bifurcated member into engagement with the clutch release members and thus turn the coil spring in a manner tending to unwind the coils, thereby releasing the spring from the drums.

It is among the objects of the present invention to provide a means for releasing a spring type clutch which requires a minimum of force and movement.

Another object of the invention is to provide a clutch mechanism which is normally biased to engagement for transferring power from an electric motor and which may be easily released by a solenoid operated mechanism.

It is also an object of the invention to provide a clutch release mechanism suitable for use in cooperation with a spring type clutch used in connection with an electrical reset type timer.

The invention may take physical form in certain parts and arrangements of parts, a specific embodiment of which is described in the following detailed description and drawings wherein.

Figure 1:
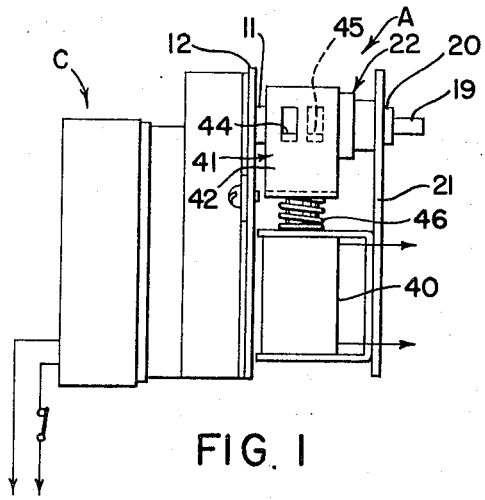
FIGURE 1 is an elevational view of a solenoid operated clutch mechanism embodying the present invention and used in connection with an electric motor.

Referring more particularly to the drawings which illustrate a preferred embodiment of the invention and are not for the purpose of limitation, FIGURE 1 shows a spring type clutch A embodying the invention, which is used in connection with a reset timer and which is actuated by a solenoid B, the drive being supplied by a synchronous electric motor C.

The motor C has a drive shaft 10 journaled in a bearing number 11 and extending through a mounting bracket 12. Mounted on the outer end of the drive shaft 10 and nonrotatably secured thereto by setscrew 15 is a drum carrier 13. Extending outwardly from the drum carrier 13 is a cylindrical portion of small diameter which forms a driving drum 14.

Located adjacent to and coaxial with the drive shaft 10 is a take off shaft 19 with a reset timer (not shown). The shaft 19 is journaled in a bearing 20 mounted in a bracket 21 which also serves to support the timer. Splined to the inner end of the shaft 19 is a drum carrier 22. The outer end of the drum carrier 22 has a cylindrical portion 23 which forms the driven or output drum of the clutch mechanism A. A bearing 24 is contained within the cylindrical portion 23 of the drum carrier 22 to allow free rotation of the drum carrier 22 on the shaft 10 when the clutch is disengaged.

Figure 3:
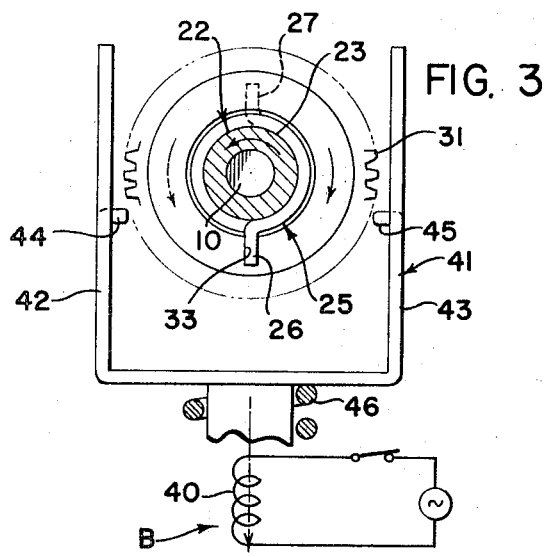
FIGURE 3 is a fragmentary transverse sectional view taken on the line 3—3 of FIGURE 2 and including a schematic diagram of the solenoid control circuit.
Figure 2:
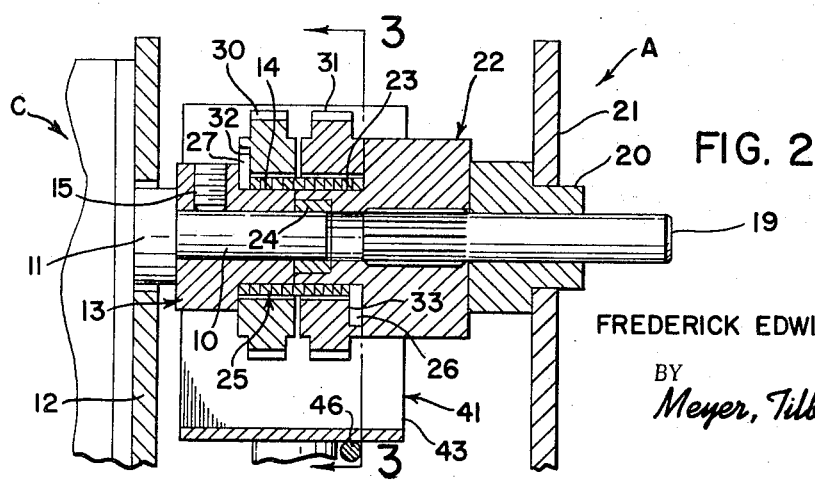
FIGURE 2 is a fragmentary sectional view of the clutch mechanism of FIGURE 1 showing the clutch in its engaged condition.

Positioned around the drums 14 and 23 is a coil spring 25 formed of rectangular stock and having its helices closely adjacent one another. The inner diameter of the coil spring 25 in its normal unstressed condition, is slightly smaller than the diameter of the drums 14 and 23 so that the spring is biased to grip both of the drums and provide clutch engagement as shown in FIGURES 2 and 3.

Figure 4:
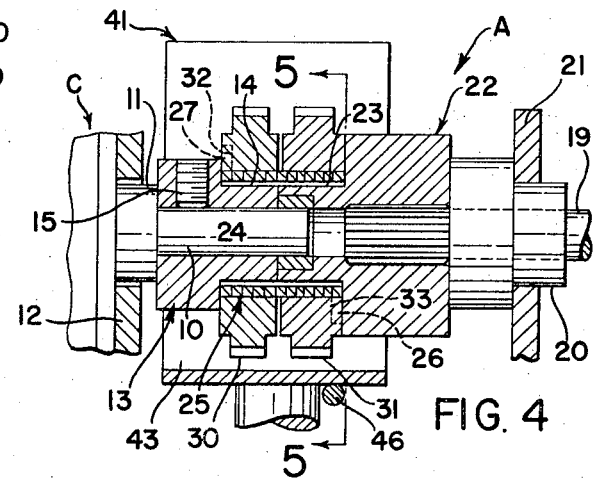
FIGURE 4 is an enlarged fragmentary sectional view of the clutch mechanism of FIGURE 1 showing the clutch in its disengaged condition.
Figure 5:
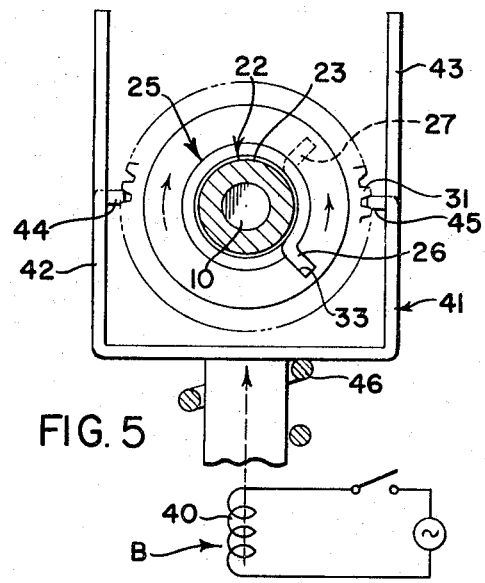
FIGURE 5 is a fragmentary transverse sectional view taken on the line 5—5 of FIGURE 4 and including a schematic diagram of the solenoid control circuit.

The ends 26, 27 of the spring 25 project outwardly as shown and by turning the ends 26, 27 in a manner tending to unwind the spring 25, the helices are expanded to a diameter larger than that of the drums 14 and 23 to release the clutch as shown in FIGURES 4 and 5.

Concentrically disposed around the coil spring 25 are two sprockets 30, 31 which may be turned relative to the spring 25 and relative to each other. The sprocket 30 has a radial slot 32 formed therein which receives the end 27 of the spring 25 and the sprocket 31 has a slot 33 formed therein which receives the end 26. Accordingly, when the sprockets 30, 31 are turned in opposite directions in a manner tending to unwind the spring 25 as best shown on FIGURE 5, the clutch will disengage.

Attached to the inner face of the plate 21 is the solenoid B having a coil 40 and a bifurcated member 41 adapted for linear movement in a direction perpendicular to the axis of the drums 14 and 23. The member 41 has two parallel arms 42, 43 which are spaced apart sufficiently to receive the sprockets 30, 31 therebetween.

Oppositely mounted on the inner face of the arms 42, 43 are inwardly extending projections 44, 45. The projection 44 is positioned to engage the sprocket 30 and the projection 45 is positioned to engage the sprocket 31.

According to the present invention, when the return spring 46 of solenoid B moves the bifurcated member 41 toward the axis of rotation of the clutch drums 14 and 23, the projections 44 and 45 engage the sprockets 30 and 31 respectively and turn them in opposite directions as shown in FIGURE 5. The sprockets turn the ends 26, 27 of the coil spring 25 in a direction tending to unwind the coils, the turning being sufficient to expand the helices of the spring to a diameter larger than the diameter of the clutch drums 14, 23. This frees the spring from the driving drum 14 and also from the driven or output drum 23.

In this particular application of the invention, the reset timer mechanism (not shown) is spring biased to a reset position so that the take-off shaft 19 upon clutch release, will immediately rotate in the opposite direction back to the reset position. With the spring 25 being released from the drum 23 the take off shaft 19 is free for counter rotation.

Means other than the solenoid B may of course be used to operate the bifurcated member 41 as will be apparent to those skilled in the art. Also it will be apparent that the direction of movement of the bifurcated member for the purpose of disengaging the clutch may be either toward or away from the axis of the drums depending of course, upon the direction in which the spring is wound and the relative location of the projections 44 and 45.

While the specific means disclosed in the detailed description and drawing for turning the ends of the coil spring 25 in opposite directions is a pair of sprockets 30 and 31, it will be apparent that many other means may be used. For example the sprockets may be replaced by disks or wheels having smooth cylindrical outer edge faces that are engageable by any means that would oppositely rotate them to unwind the end of spring 25 and disengage the clutch.

The clutch may also be used in connection with many different types of electric motors and with many types of equipment other than reset timers.

The invention has been described with reference to a specific embodiment, however many modifications may be made in the above construction and many widely different embodiments of this invention may be used without departing from the scope and spirit thereof. It is intended that all matter contained in the above description and shown in the accompanying drawings shall be interpreted as illustrative and not in a limiting sense.

Having thus described my invention, I claim:

1. A clutch comprising a driving drum and a driven drum leaving a common axis of rotation, a coil spring concentrically disposed around said drums and being biased to gripping engagement therewith, two clutch release members secured to opposite ends of said coil spring and mounted for rotary movement relative to one another, a reciprocable member having a bifurcated end portion, said end portion having means for concurrently engaging and driving both of said clutch release members in opposing directions about said common axis during movement of said reciprocable member so that said end portion turns the ends of said spring in a manner tending to unwind said spring to expand said spring out of engagement with said drums, and means for moving said reciprocable member.

2. A clutch as defined in claim 1 wherein said clutch release members are sprockets.

3. In a spring clutch having a driven shaft and a driving shaft and having a common axis of rotation, a coiled spring coaxially wrapped about at least adjacent portions of said shafts, said spring having an internal diameter sufficiently small relative to the outer diameters of said shafts that said spring is normally in resilient gripping relationship with both of said shafts, the improvement comprising: said spring having opposing free ends; and, clutch release means for concurrently engaging and displacing said free ends in opposing directions about said common axis so as to unwind and increase the internal diameter of said spring whereby it is released from its gripping relationship with said shafts.

4. In a spring clutch as set forth in claim 3, wherein said adjacent shaft portions are cylindrical and of the same diameter and said coil spring has helices with flat, shaft portion engaging faces.

5. In a spring clutch as set forth in claim 3, wherein said clutch release means includes a pair of wheels, each loosely mounted on one of said shafts and secured to one of said free ends of said spring.

6. In a spring clutch as set forth in claim 5, wherein said wheels are sprocket wheels, each having a plurality of radially extending teeth.

7. In a spring clutch as set forth in claim 6, wherein said engaging and driving means includes a pair of projections on a common movable mount, with each projection adapted to engage one tooth of each sprocket wheel.

8. In a spring clutch as set forth in claim 7, including electromagnetic means for displacing said movable mount so that said projections engage said sprocket wheels.

9. In a spring clutch as set forth in claim 8, wherein said electromagnetic means is a solenoid having a linearly movable core connected to said mount for linearly displacing said mount.

References Cited

UNITED STATES PATENTS

| | | | |
|---|---|---|---|
| 2,829,748 | 4/1958 | Sacchini et al. | 192—26 |
| 2,883,022 | 4/1959 | Clausing et al. | 192—81 X |
| 2,885,896 | 5/1959 | Hungerford et al. | 192—81 X |
| 3,104,745 | 9/1963 | Wipke | 192—81 |

CARLTON R. CROYLE, *Primary Examiner.*

ARTHUR T. McKEON, *Examiner.*